United States Patent [19]

Sekigawa

[11] 4,349,846
[45] Sep. 14, 1982

[54] PICTURE PROCESSING METHOD

[75] Inventor: Keiji Sekigawa, Yokohama, Japan

[73] Assignee: Ricoh Company, Ltd., Tokyo, Japan

[21] Appl. No.: 139,395

[22] Filed: Apr. 11, 1980

[30] Foreign Application Priority Data

| Apr. 17, 1979 | [JP] | Japan | 54-47071 |
| Apr. 17, 1979 | [JP] | Japan | 54-47072 |
| Apr. 17, 1979 | [JP] | Japan | 54-47073 |
| Jun. 2, 1979 | [JP] | Japan | 54-69041 |

[51] Int. Cl.$^3$ .............................................. H04N 1/40
[52] U.S. Cl. .................................. 358/280; 358/283;
                                               358/138; 364/515
[58] Field of Search ............... 358/283, 260, 280, 261,
                                               358/138; 364/515

[56] References Cited

U.S. PATENT DOCUMENTS

| 4,184,206 | 1/1980 | Harano | 358/283 |
| 4,214,277 | 7/1980 | Urich | 358/283 |
| 4,258,393 | 3/1981 | Ejiri et al. | 358/283 |
| 4,280,144 | 7/1981 | Bacon | 358/283 |

Primary Examiner—John C. Martin
Assistant Examiner—Edward L. Coles
Attorney, Agent, or Firm—Oblon, Fisher, Spivak, McClelland & Maier

[57] ABSTRACT

A picture is sampled to provide the density levels of picture elements forming the picture. The estimation density level of an aimed picture element (to be processed) is calculated according to a particular equation, by using the density level of the aimed picture element and those of picture elements surrounding the aimed picture element. The estimation density level thus calculated is compared with a threshold, corresponding to the aimed picture element, in a threshold pattern, to determine whether the level of the aimed picture element is black or white. This process is carried out for all of the picture elements to restore the picture with binary outputs.

4 Claims, 28 Drawing Figures

FIG. 1

| $P_{i-1,j-1}$ | $P_{i,j-1}$ | $P_{i+1,j-1}$ |
|---|---|---|
| $P_{i-1,j}$ | $P_{i,j}$ | $P_{i+1,j}$ |
| $P_{i-1,j+1}$ | $P_{i,j+1}$ | $P_{i+1,j+1}$ |

FIG. 2

| $Q_{i-1,j-1}$ | $Q_{i,j-1}$ | $Q_{i+1,j-1}$ |
|---|---|---|
| $Q_{i-1,j}$ | $Q_{i,j}$ | $Q_{i+1,j}$ |
| $Q_{i-1,j+1}$ | $Q_{i,j+1}$ | $Q_{i+1,j+1}$ |

FIG. 3

| LINE | | | | | | | | | | | | |
|---|---|---|---|---|---|---|---|---|---|---|---|---|
| 1  | 4 | 4 | 3 | 3 | 2 | 2 | 1 | 1 | 1 | 1 | 1 | 1 |
| 2  | 4 | 3 | 3 | 2 | 2 | 1 | 1 | 1 | 1 | 1 | 1 | 1 |
| 3  | 3 | 3 | 2 | 2 | 1 | 1 | 1 | 1 | 1 | 1 | 1 | 1 |
| 4  | 3 | 2 | 2 | 1 | 1 | 1 | 1 | 1 | 1 | 3 | 3 | 3 |
| 5  | 2 | 2 | 1 | 1 | 1 | 1 | 1 | 1 | 3 | 3 | 3 | 4 |
| 6  | 2 | 1 | 1 | 1 | 1 | 1 | 3 | 3 | 3 | 4 | 4 | 4 |
| 7  | 1 | 1 | 1 | 1 | 1 | 3 | 3 | 3 | 4 | 4 | 2 | 2 |
| 8  | 1 | 1 | 1 | 1 | 3 | 3 | 4 | 4 | 2 | 2 | 2 | 2 |
| 9  | 1 | 1 | 1 | 2 | 3 | 4 | 4 | 2 | 2 | 2 | 1 | 1 |
| 10 | 1 | 1 | 2 | 2 | 4 | 4 | 2 | 2 | 1 | 1 | 1 | 1 |
| 11 | 1 | 2 | 2 | 4 | 4 | 2 | 2 | 1 | 1 | 1 | 1 | 1 |
| 12 | 2 | 2 | 2 | 3 | 2 | 2 | 1 | 1 | 1 | 1 | 1 | 1 |

| X₁ | X₂ | X₃ |
|----|----|----|
| X₄ | X₅ | X₆ |
| X₇ | X₈ | X₉ |

FIG. 13

| Q₁ | Q₂ | Q₃ |
|----|----|----|
| Q₄ | Q₅ | Q₆ |
| Q₇ | Q₈ | Q₉ |

FIG. 14

| O₁ | O₂ | O₃ |
|----|----|----|
| O₄ | O₅ | O₆ |
| O₇ | O₈ | O₉ |

| 15 | 7  | 13 | 5  |
|----|----|----|----|
| 3  | 11 | 1  | 9  |
| 12 | 4  | 14 | 6  |
| 0  | 8  | 2  | 10 |

FIG. 16

| 0  | 1  | 2  | 3  | 5  | 7  | 10 | 13 |
|----|----|----|----|----|----|----|----|
| 1  | 2  | 3  | 5  | 7  | 10 | 13 | 15 |
| 2  | 3  | 5  | 7  | 10 | 13 | 15 | 14 |
| 3  | 5  | 7  | 10 | 13 | 15 | 14 | 12 |
| 5  | 7  | 10 | 13 | 15 | 14 | 12 | 9  |
| 7  | 10 | 13 | 15 | 14 | 12 | 9  | 6  |
| 10 | 13 | 15 | 14 | 12 | 9  | 6  | 4  |
| 13 | 15 | 14 | 12 | 9  | 6  | 4  | 3  |
| 15 | 14 | 12 | 9  | 6  | 4  | 3  | 2  |

| 0  | 1  | 2  | 3  | 5  | 7  | 10 | 13 |
|----|----|----|----|----|----|----|----|
|    |    |    |    |    |    |    | 15 |
| 1  | 2  | 3  | 5  | 7  | 10 | 13 | 14 |
| 2  | 3  | 5  | 7  | 10 | 13 | 15 | 12 |
| 3  | 5  | 7  | 10 | 13 | 15 | 14 | 9  |
| 5  | 7  | 10 | 13 | 15 | 14 | 12 | 6  |
| 7  | 10 | 13 | 15 | 14 | 12 | 9  | 4  |
| 10 | 13 | 15 | 14 | 12 | 9  | 6  | 3  |
| 13 | 15 | 14 | 12 | 9  | 6  | 4  | 2  |

FIG. 17

PRIOR ART

PICTURE PROCESSING METHOD

BACKGROUND AND SUMMARY OF THE INVENTION

This invention relates to a picture processing method in which a picture including half tone is restored (reproduced) with binary outputs.

In the case where picture signals read on the input side of a picture input and output device such as a digital type copying machine or facsimile equipment are transmitted to the output side thereof, a great problem is involved that is how to reproduce a picture substantially similar to an original picture with binary outputs on the output side while the picture signal transmission efficiency is improved in the decrease of the transmission capacity and in the reduction of the transmission time.

A method of reproducing a high tone picture by processing picture signals which are obtained by scanning or sampling an original picture such as a photograph including half tone by the picture element is known in the art. In this conventional method, a difference between the density level of an aimed picture element (i.e., a picture element to be processed) and the density level of the picture element which is positioned immediately before the aimed picture element is coded and transmitted to the output side, and in the output side the coded signal of the density level difference is decoded, so that a high tone picture is reproduced with multi-base or two-base (binary) outputs.

However, the conventional method is still disadvantageous in the following points: In order to reproduce a picture such as a photography including half tone with high quality in the conventional method, it is necessary to use high tone (at least sixteen tones) density levels. That is, the picture is sampled in at least sixteen tones. Accordingly, even if the aforementioned difference coding is carried out in the input side, an average bit length per picture element exceeds two (2) bits/picture-element (for instance, when a picture is sampled in 16 tones, the difference between the density level of an aimed picture element and that of the preceding picture element becomes frequently two (2), and if the difference is two (2), then the number of coded bits will be three), and accordingly the time required to transmit the coded signal to the output side is increased as much.

Accordingly, a first object of this invention is to provide a picture processing method, in which the transmission efficiency, especially the transmission time can be improved by sampling a picture in low tone, and yet a high tone picture excellent in picture quality can be restored (reproduced).

Furthermore, a so-called "systematic dither method" is also known as a method of reproducing a high tone picture with binary outputs, in which a picture such as photograph including half tone is scanned by the picture element, and the resultant picture signals are processed to provide the binary outputs.

In the systematic dither method, a picture made of picture elements arranged in matrix form is covered, in its entirety, by a sub-matrix of n×n arrangement, and a predetermined dither pattern is provided for the submatrix, so that the level of each picture element is determined as black or white with the dither values thereof as thresholds.

However, the conventional dither method is also disadvantageous in the following points: When a picture including half tone is sampled with (n picture elements/mm × m picture elements/mm), then the output of the picture is also of the same (n picture elements/mm × m picture elements/mm). Therefore, the resultant reproduced picture is low in resolution. For instance, in the case where a picture including half tone is sampled with (8 picture elements/mm × 8 picture elements/mm) and the read picture data are subjected to dither process, the output picture is expressed by the black and white picture elements of (8 picture elements/mm × 8 picture elements/mm). If, in this case, a dither matrix of 2×2 arrangement is used in the dither process, the resolution is not very lowered, but a high tone picture cannot be restored. If a dither matrix of 4×4 arrangement is employed, the reproduced picture may be of high tone, but the resolution is lowered; that is, the restored picture is low in picture quality.

Accordingly, a second object of the invention is to provide a picture processing method in which, in restoring a picture including half tone with binary outputs, a high tone picture excellent in resolution can be provided.

Furthermore, in the above-described systematic dither method, the picture signals which are provided by scanning the picture by the picture element with an image sensor are subjected to n-base quantization by an analog-to-digital converter, and the above-described process is carried out in accordance with the density levels of the thus-quantized picture signals, so that the picture is restored with the binary outputs. However, in this case, the number of tones of the restored picture cannot exceed n. For instance, where the picture signal quantization level in the input side is of 4-base, the number of tones of a picture restored in the output side is four or less. In contrast, in the case where it is required to provide a restored 8-tone picture in the output side, 8-base quantization must be carried out in the input side. Therefore, in the case of a 4-tone picture, a 2-bit analog-to-digital converter can be satisfactorily employed. However, in the case of an 8-tone picture, a 3-bit analog-to-digital converter must be employed, and in the case of a 16-tone picture, a 4-bit analog-to-digital converter must be used. Thus, as the number of tones in a picture is increased, the number of bits of an analog-to-digital converter used must be increased.

Furthermore, as the number of quantization levels in the input side is increased, the number of bits in transmitting the quantized signals to the output side is increased. Thus, the transmission efficiency is decreased, and the transmission time is increased.

Accordingly, a third object of this invention is to provide a picture processing method, in which a picture including half tone is quantized in low tone, thereby to reduce the number of bits in the quantized signals, and yet a high tone picture excellent in resolution can be restored with binary outputs.

The nature, principle and utility of the invention will become more apparent from the following detailed description when read in conjunction with the accompanying drawings.

BRIEF DESCRIPTION OF THE DRAWINGS

In the accompanying drawings:

FIG. 18 is a diagram showing the density levels of the minute picture elements which are processed by the third example of the method of the invention, by using the data in FIG. 16;

DETAILED DESCRIPTION OF THE INVENTION

One example of a picture processing method according to a first aspect of this invention will be described with reference to FIGS. 1 through 7.

Figure 1:
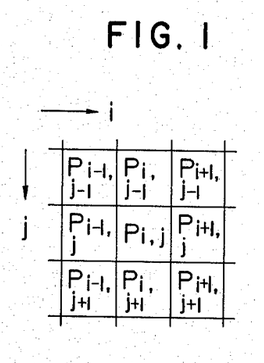
FIG. 1 is an explanatory diagram showing a particular picture element region which is provided by decomposing a picture into picture elements.
Figure 2:
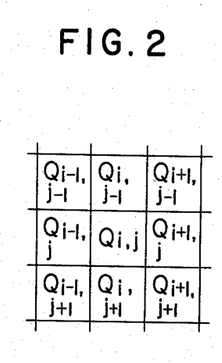
FIG. 2 is an explanatory diagram showing density level data obtained by sampling the picture elements.

FIG. 1 shows a picture element region in 3×3 construction, which is decomposed into nine picture elements. The picture elements $P_{i-1,j-1}, \ldots P_{i+1,j+1}$ are sampled in low tone to provide the density level data of the picture elements as shown in FIG. 2. In the above-described picture input and output device, the density level data $Q_{i-1,j-1}$ through $Q_{i+1,j+1}$ are coded into coded signals, which are transmitted over to the output side. In this case, as the sampling number on the input side is of the low tone, for instance in the case of four tones the coded signal is of 2 bits/picture element, and in the case of eight tones it is of 3 bits/picture element, it is possible to transmit the coded signals at high speed and to readily decode them.

First, the estimation density level $I_{i,j}$ of an aimed picture element $P_{i,j}$ is calculated in accordance with the following equation by using the density level data $Q_{i,j}$ of the aimed picture element which is obtained by sampling it in low tone and the density level data $Q_{i-1,j-1} \ldots Q_{i-1,j}, Q_{i+1,j} \ldots Q_{i+1,j+1}$ of the eight picture elements $P_{i-1,j-1} \ldots P_{i-1,j}, P_{i+1,j} \ldots P_{i+1,j+1}$ surrounding the aimed picture element:

$$I_{i,j} = k(a \cdot Q_{i-1,j-1} + b \cdot Q_{i,j-1} + c \cdot Q_{i+1,j-1} + d \cdot Q_{i-1,j} + e \cdot Q_{i,j} + f \cdot Q_{i+1,j} + g \cdot Q_{i-1,j+1} + h \cdot Q_{i,j+1} + i \cdot Q_{i+1,j+1}) \quad (1)$$

where k is the modulation factor which is defined by (output tone level number)/(input sampling level number) and is an integer of two (2) or larger, and a through i are the weight factors of the picture elements, with $a+b+c+d+e+f+g+h+i=1$.

In the picture processing method of the invention, a threshold pattern $T_{l,m}$ which is divided in matrix form in correspondence to the modulation factor k in the equation (1) and is threshold-set in correspondence to the picture elements, is prepared in advance. This threshold pattern $T_{l,m}$ is compared with a threshold $T_{l,m}$ corresponding to the estimation density level $I_{i,j}$ of the aimed picture element which has been obtained from the equation (1), thereby to determine whether a picture element signal to be outputted is at a black level or a white level, as follows:

(i) When $I_{i,j} \geq T_{l,m}$, the picture element signal is at the black level.

(ii) When $I_{i,j} < T_{l,m}$, the picture element signal is at the white level.

This process is carried out for all of the picture elements from the first picture element $P_{l,l}$ to the last one $P_{max,max}$. As a result, a picture high in tone and excellent in quality can be reproduced from the picture element signals which are provided by sampling the original picture in low tone.

One concrete example of the picture processing method in which the densities of picture elements obtained by scanning a picture are sampled in four tones, and a picture having sixteen tones is produced from the density level data, will be described.

Figure 3:
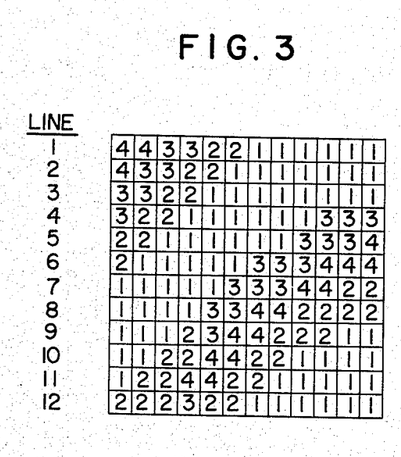
FIG. 3 is a diagram showing one example of density level data which are provided by sampling the picture elements in four tones.
Figure 4:
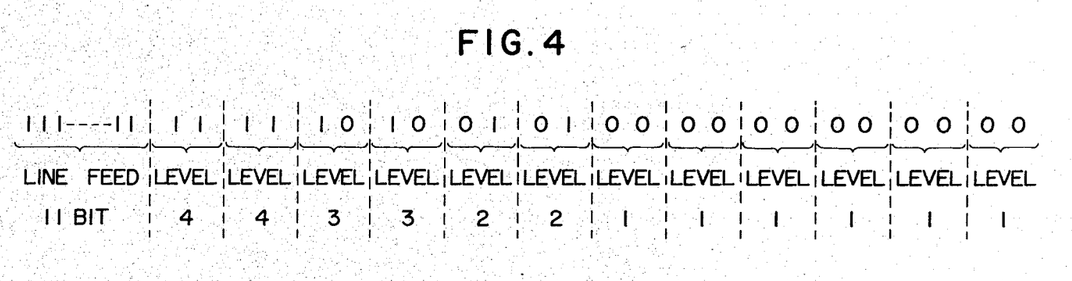
FIG. 4 is a diagram showing a coded signal of the density level data on the first line in FIG. 3.

One example of a picture which has four-tone density level data which are obtained by sampling it is as shown in FIG. 3. Such density level data obtained on the input side are coded, as they are, into a series of codes for one line, which is transmitted to the output side. FIG. 4 shows coded density level data for the first line in the picture in FIG. 3. The coded signals thus provided are decoded at the output side into the data as shown in FIG. 3. This decoding can be readily achieved because each coded density level data is of 2-bit/picture element.

In order to simplify the description, the determination of an estimation density level $T_{i,j}$ by using the density level data of the aimed picture element $P_{i,j}$ and of four picture elements $P_{i,j-1}$, $P_{i-1,j}$, $P_{i+1,j}$ and $P_{i,j+1}$ directly surrounding the aimed picture element will be described.

In this case, the modulation factor k is 4 (=16/4). If each of the weight factors b, d, e, f and h is constant or $\alpha$, then $\alpha = 0.2$ from $b+d+e+f+h=1$, and the equation (1) is:

$$T_{i,j} = 4(0.2 \times Q_{i,j-1} + 0.2 \times Q_{i-1,j} + 0.2 \times Q_{i,j} + 0.2 \times Q_{i+1,j} + 0.2 \times Q_{i,j+1}) \quad (2)$$

Figure 5:
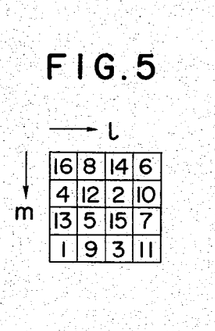
FIG. 5 is a diagram showing one example of a threshold pattern.
Figure 6:
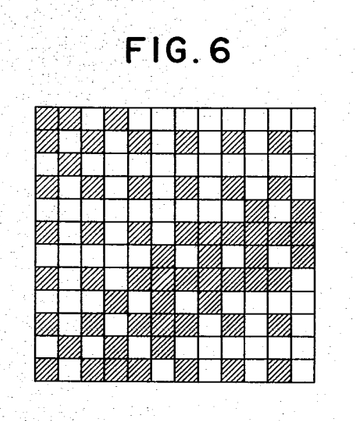
FIG. 6 is a diagram showing a picture which is restored (reproduced) according to a first example of a picture processing method of this invention.

FIG. 5 shows a threshold pattern which has been preset in this example. The estimation density level $T_{i,j}$ which is obtained from the equation (2) is compared with the threshold $T_{l,m}$ in the threshold pattern which corresponds to the estimation density level, so that the level of the picture element signal to be outputted is determined as black or white, as described before. The output picture which has been reproduced through estimation from the picture of FIG. 3 is as shown in FIG. 6.

Thus, according to the picture processing method of the invention, a picture high in tone and excellent in quality can be obtained at high speed from sampling picture signals of low tone.

Figure 7:
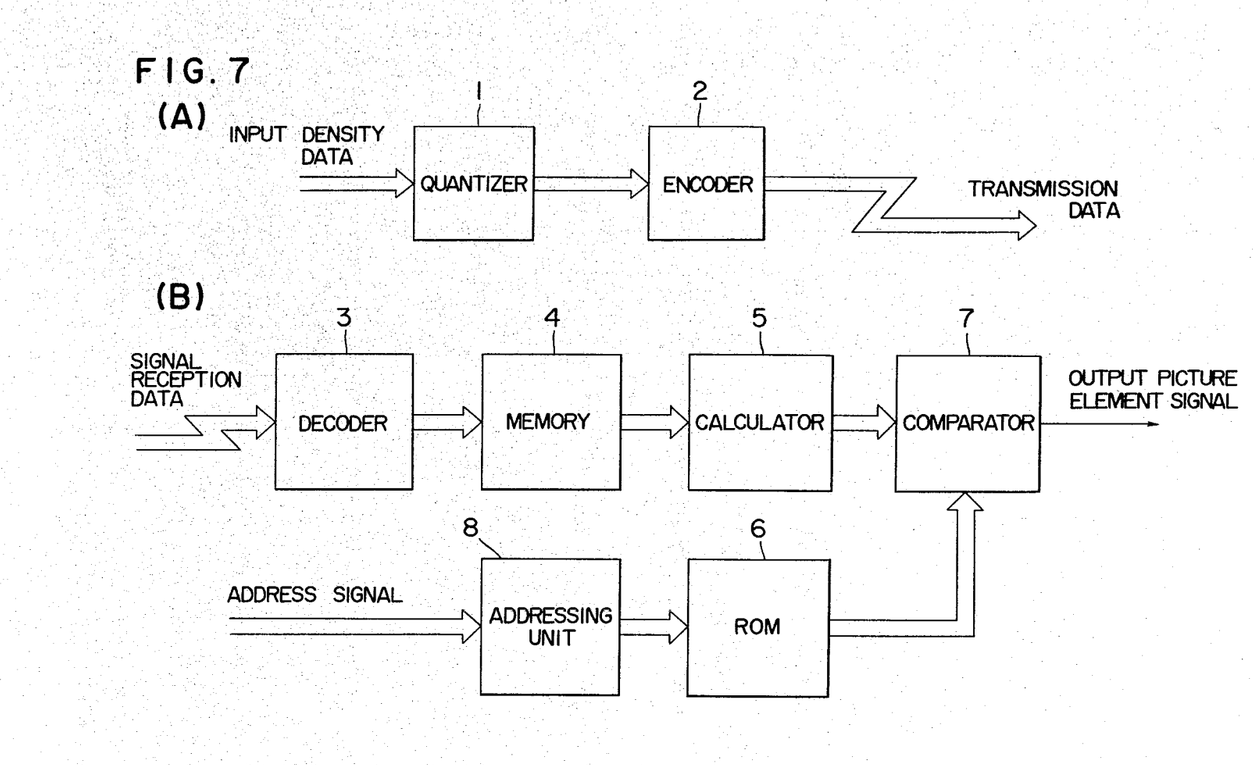
FIG. 7 (comprised of A and B) is a block diagram showing an apparatus for practicing the picture processing method.

FIG. 7 shows one example of an apparatus for practicing the above-described picture processing method. In the picture input side A, the density data of each picture element which is detected by scanning a picture is sampled in low tone by a quantizer 1. Each sampling signal is encoded by an encoder 2 into a coded signal, which is transmitted to the output side B. In the output side B, the coded signal from the input side A is decoded by a decoder 3, and the contents of the decoded signals are collectively stored in a memory 4 temporarily so that the density level data of the picture elements in the particular picture element region are stored therein temporarily. Then, calculation according to the equation (1) is carried out by a calculator 5 by using the contents stored in the memory 4, so that the estimation density level $T_{i,j}$ of the aimed picture element is provided. The estimation density level $T_{i,j}$ is compared with the threshold $T_{l,m}$ which is called by a read-only memory 6 in which the threshold pattern has been stored, in a comparator 7. According to a result of the comparison, a black or white level picture element signal is outputted. In FIG. 7, reference numeral 8 designates an addressing unit adapted to direct addressing for calling picture element data necessary for calculation into the memory 4 in response to address signals which are externally applied thereto, and for calling threshold values corresponding thereto from the read-only memory 6.

In the above-described picture processing method of the invention, in restoring through estimation a picture including half tone with binary outputs, the density levels of the picture elements of the picture are read by sampling the picture in low tone, the estimation density level of an aimed picture element is obtained in accordance with the particular calculating equation including the modulation factor and the weight factors of the aimed picture element and the picture elements in the particular picture element region surrounding the aimed picture element, by utilizing the density levels of these picture elements, the estimation density level is compared with a threshold, corresponding to the aimed picture element, in the preset threshold pattern, and as a result of the comparison the aimed picture element's level is determined as black or white. Since the sampling in low tone is carried out on the input side, transmission of the coded signals to the output side can be effectively carried out, especially at high speed. In addition, the picture can be reproduced into a picture high in tone and excellent in quality on the output side.

A second example of the picture processing method according to this invention will be described with reference to FIGS. 1, 2, and 8 through 11.

Similarly as in the picture processing method according to the first example described above, the estimation density level $I_{i,j}$ is calculated according to the equation (1) described above.

In this example, the modulation factor k in the equation (1) is defined by (output tone number)/(input quantization number). A plurality of threshold patterns (FIG. 9) in which optimum thresholds corresponding to the picture elements have been set separately according to the modulation factors k are provided in advance.

One threshold pattern $T_k$ corresponding to a required modulation factor k is selected. Then, out of the threshold pattern, a threshold $t_{l,m}$ corresponding to the aimed picture element is extracted, so that its value $t_{l,m}$ is compared with the result $I_{i,j}$ of the aforementioned calculation. According to a result of the comparison, the level of the aimed picture element is determined as black or white. More specifically, (i) When $I_{i,j} \geq t_{l,m}$, the aimed picture element is at the black level (or the "1" level output).

(ii) When $I_{i,j} < t_{l,m}$, the aimed picture element is at the white level (or the "0" level output).

If the above-described process is carried out for all of the picture elements in the picture by regarding each as the aimed picture element, then a picture high in tone and excellent in quality can be reproduced from the picture which has been read by quantization in low tone.

Figure 8:
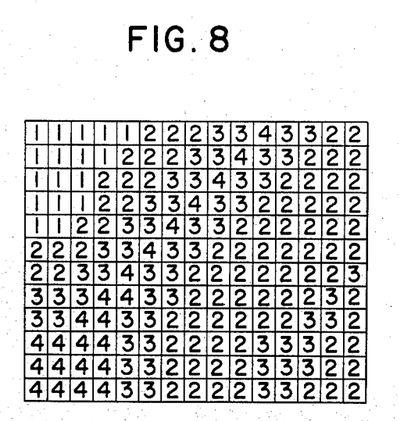
FIG. 8 is a diagram showing one example of the density levels of picture elements which are provided by subjecting a picture to 4-tone quantization according to a second example of the picture processing method of the invention.
Figure 9:
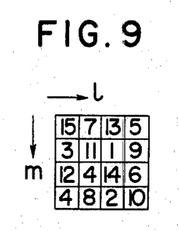
FIG. 9 is a diagram showing one example of a threshold pattern employed in the second example of the method of the invention.

One example of the density level condition of a picture which has been subjected to 4-base quantization is shown in FIG. 8. In this case, the modulation factor k is 4 (=16/4). A threshold pattern having thresholds most suitable for the modulation factor k=4 is as shown in FIG. 9.

The case where, for instance, the density level of an aimed picture element Pi,j and those of four picture elements Pi,j−1, Pi−1,j, Pi+1,j and Pi,j+1 are used to determine the estimation density level Ii,j of the aimed picture element according to the picture processing method, will be described. Similarly as in the method according to the first aspect of the invention, if the weight factors are constant, or $\alpha$, then the value $\alpha$ is 0.2 from (b+d+e+f+h=1), and the estimation density level can be calculated from the aforementioned equation (2).

Figure 10:
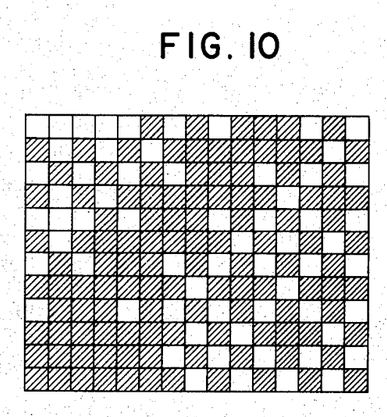
FIG. 10 is a diagram showing a picture which is reproduced (restored) by processing the picture in FIG. 8 in accordance with the second example of the method of the invention.

The thus-calculated estimation density level Ii,j of the aimed picture element is compared with a threshold in the threshold pattern (FIG. 9) which corresponds to the aimed picture element, as a result of which the output level of the aimed picture element can be determined. A picture which is restored (reproduced) by processing the picture in FIG. 8 is as shown in FIG. 10.

Figure 11:
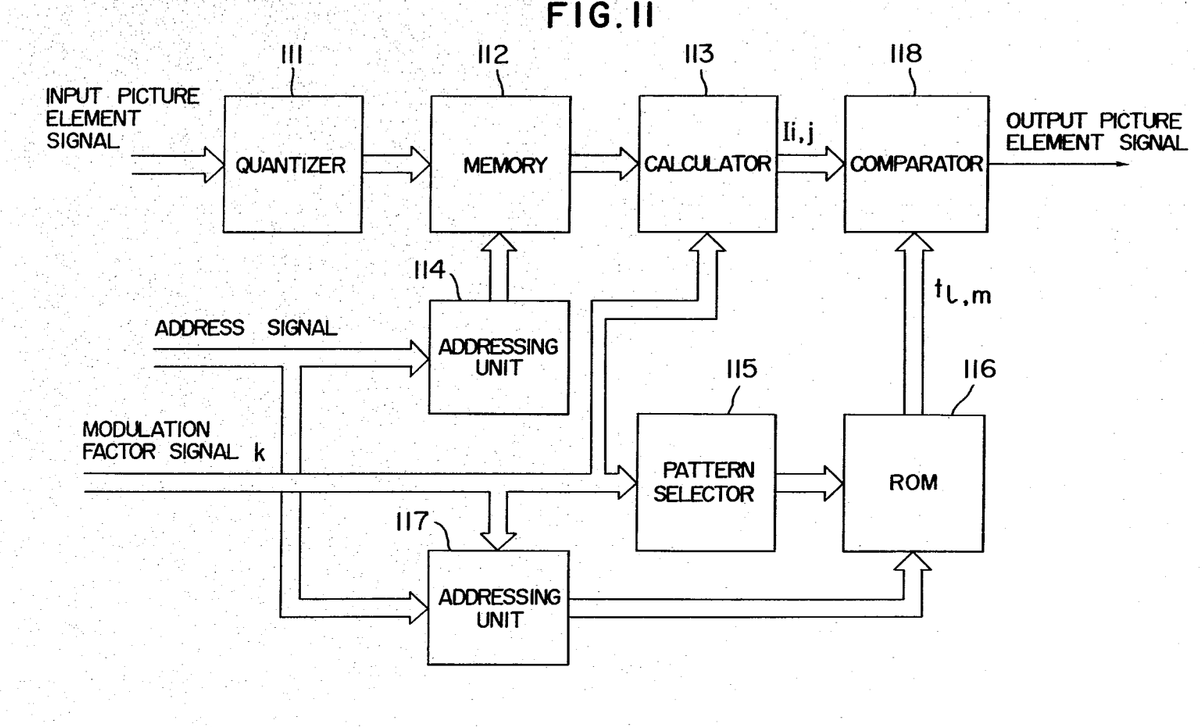
FIG. 11 is a block diagram showing an apparatus for practicing the second example of the method of the invention.

FIG. 11 shows one example of an apparatus for practicing the above-described method of the invention. Input picture elements obtained successively by scanning a picture including half tone are applied to a quantizer (or an analog-to-digital converter) 111, where the density data thereof are quantized in low tone to provide quantized signals. The quantized signals thus provided are collectively stored in a memory 112 temporarily. Then, a calculator 113 calculates the estimation density level Ii, j of the aimed picture element in accordance with the aforementioned equation (1) in response to the contents of the memory 112 and a modulation factor signal k which is externally applied. In this operation, an addressing unit 114 calls the data of the picture elements required for the calculation out of the memory 112 in response to address signals which are externally applied thereto. Simultaneously, the modulation factor signal k is applied to a threshold pattern selector 115, where a pattern selection corresponding to the modulation factor signal k is carried out, and the selection signal is applied to a read-only memory 116 in which a plurality of threshold patterns have been stored. A threshold, in the selected pattern, which corresponds to the aimed picture element is called out of the read-only memory 116 by an instruction from an addressing unit 117 in accordance with an externally applied address signal and the modulation factor signal k. Then, the output Ii,j of the calculator 113 is compared with the output $t_{l,m}$ of the read-only memory 116 in a comparator 118. A binary output picture element signal whose level has been determined as a black level or a white level as a result of the comparisons, is provided.

As is apparent from the above description, in the picture processing apparatus thus organized, a picture is read in low tone on the input side. Therefore, the bit capacities of the quantizer 111 and the memory 112 can be reduced. Accordingly, the quantized signals can be transmitted to the output side with high transmission efficiency and can be processed at high rate.

Furthermore, the picture processing method according to the second aspect of the invention has a significant merit that, although the simple calculation process is carried out with the quantized signals which are provided by reading a picture in low tone quantization, a picture high in tone and excellent in quality can be reproduced with the binary outputs.

One example of a picture processing method according to a second aspect of the invention will be described with reference to FIGS. 12 through 20.

Figure 12:
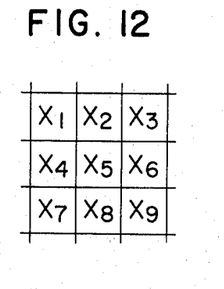
FIG. 12 is an explanatory diagram showing a particular picture element region which is provided by decomposing a picture into picture elements.
Figure 13:
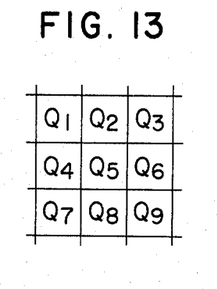
FIG. 13 is a diagram showing the density levels of the picture elements in FIG. 12, which are provided by subjecting the picture elements to multi-base quantization according to a third example of the method of the invention.

FIG. 12 shows a particular picture element region of 3×3 arrangement which is obtained by dividing into nine picture elements, similarly as in FIG. 1. FIG. 13 shows the density levels $Q_1$ through $Q_9$ of the picture elements which are provided by subjecting the picture elements $X_1$ through $X_9$ to n-base quantization. In FIG. 12, the central picture element $X_5$ will be referred to as "an aimed picture element $X_5$", and the remaining picture elements $X_1$ through $X_4$ and $X_6$ through $X_9$, as "surrounding picture elements $X_1$ through $X_4$ and $X_6$ through $X_9$" when applicable.

Figure 14:
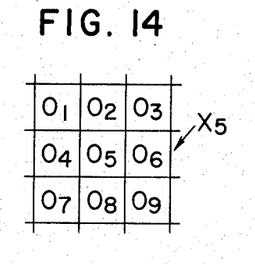
FIG. 14 is an explanatory diagram showing an aimed picture element which is divided into nine minute picture elements in 3×3 arrangement.

In the picture processing method, first the estimation density levels $q_1$ through $q_9$ of nine minute picture elements which are obtained by dividing the aimed picture element $X_5$ into nine parts as shown in FIG. 14 are calculated in accordance with the following equations (3) by using the density level $Q_5$ of the aimed picture element $X_5$ and the density levels $Q_1$ through $Q_4$ and $Q_6$ through $Q_9$ of the surrounding picture elements $X_1$ through $X_4$ and $X_6$ through $X_9$:

$$q_1 = a_1 \cdot Q_1 + a_2 \cdot Q_2 + a_3 \cdot Q_4 + a_4 19\ Q_5$$

$$q_2 = a_5 \cdot Q_2 + a_6 \cdot Q_5$$

$$q_3 = a_1 \cdot Q_2 + a_2 \cdot Q_3 + a_4 \cdot Q_5 + a_3 \cdot Q_6$$

$$q_4 = a_5 \cdot Q_4 + a_6 \cdot Q_5$$

$$q_5 = Q_5$$

$$q_6 = a_5 \cdot Q_5 + a_6 \cdot Q_6$$

$$q_7 = a_1 \cdot Q_4 + a_4 \cdot Q_5 + a_2 \cdot Q_7 + a_3 \cdot Q_8$$

$$q_8 = a_6 \cdot Q_5 + a_5 \cdot Q_8$$

$$q_9 = a_4 \cdot Q_5 + a_1 \cdot Q_6 + a_2 \cdot Q_8 + a_3 \cdot Q_9 \quad (3)$$

where $a_1$ through $a_6$ are the weight factors for the minute picture elements, with $a_1 + a_2 + a_3 + a_4 = 1$, and $a_5 + a_6 = 1$.

Figure 15:
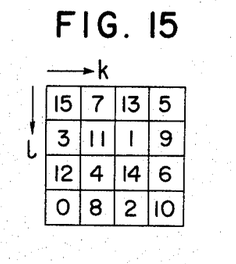
FIG. 15 is a diagram showing one example of a threshold pattern employed in the third example of the method of the invention.

In the method, a dither pattern is prepared in advance in which, as shown in FIG. 15, thresholds $T_{k,l}$ corresponding to the nine minute picture elements of the aimed picture element $X_5$ are arranged in matrix form. The density levels $q_1$ through $q_2$ which have been calculated as described are compared with the respective thresholds $T_{k,l}$, and it is determined in accordance with the following determination conditions whether the output minute picture elements $O_1$ through $O_9$ shown in FIG. 14 are at a black level or at a white level:

(i) With $q_1, q_2, \ldots, q_9 \geq T_{k,l}$, $O_1, O_2, \ldots, O_9 = $ "1" (black level)

(ii) With $q_1, q_2, \ldots, q_9 < T_{k,l}$, $O_1, O_2, \ldots, O_9 = $ "0" (white level).

If the above-described process is carried out for all of the picture elements in the picture by regarding each as the aimed picture element, then a picture high in picture element density, excellent in resolution and high in tone can be reproduced with binary outputs.

Figure 16:
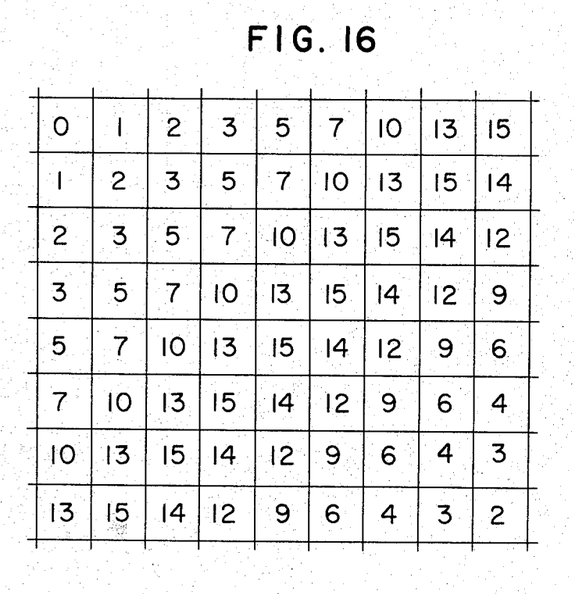
FIG. 16 is a diagram showing one example of the density levels of picture element in an original picture which are provided by subjecting the picture to hexadecimal quantization.
Figure 17:
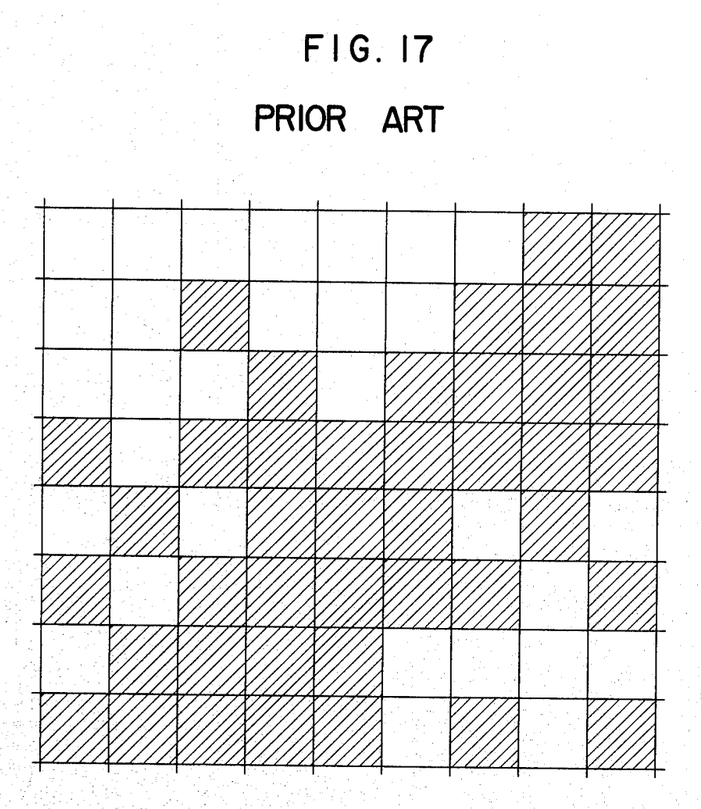
FIG. 17 is a diagram showing a picture which is reproduced in accordance with a conventional dither method by using the data in FIG. 16.
Figure 19:
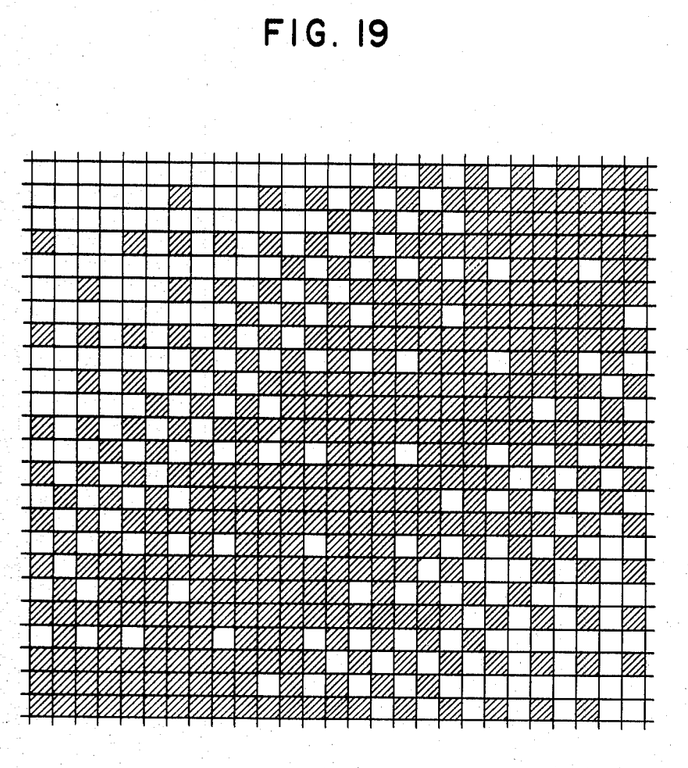
FIG. 19 is a picture which is reproduced in accordance with the third example of the method of the invention.

FIG. 16 shows one example of the density levels of picture elements, which are obtained by sampling an original picture by the picture element and represented by hexadecimal quantization. FIG. 17 shows a picture which is reproduced by processing such an original picture with a dither pattern similar to that in FIG. 15 in accordance with a conventional systematic dither method. FIG. 18 illustrates the estimation density levels of the minute picture elements of the same original picture which is processed into one high in picture element density by the picture processing method of the invention. FIG. 19 shows a picture which is reproduced by processing the estimation density levels with the threshold pattern shown in FIG. 15. However, it should be noted that, in this reproduction of the original picture, the calculation has been carried out with $a_1=a_2=a_3=1/5$, $a_4=2/5$, $a_5=\frac{1}{2}$ and $a_6=2/3$.

As is clear from comparison between FIGS. 17 and 19, the reproduced picture according to the picture processing method of the invention is more excellent in resolution than that according to the conventional systematic dither method.

Figures 20, 21, 22, 23:
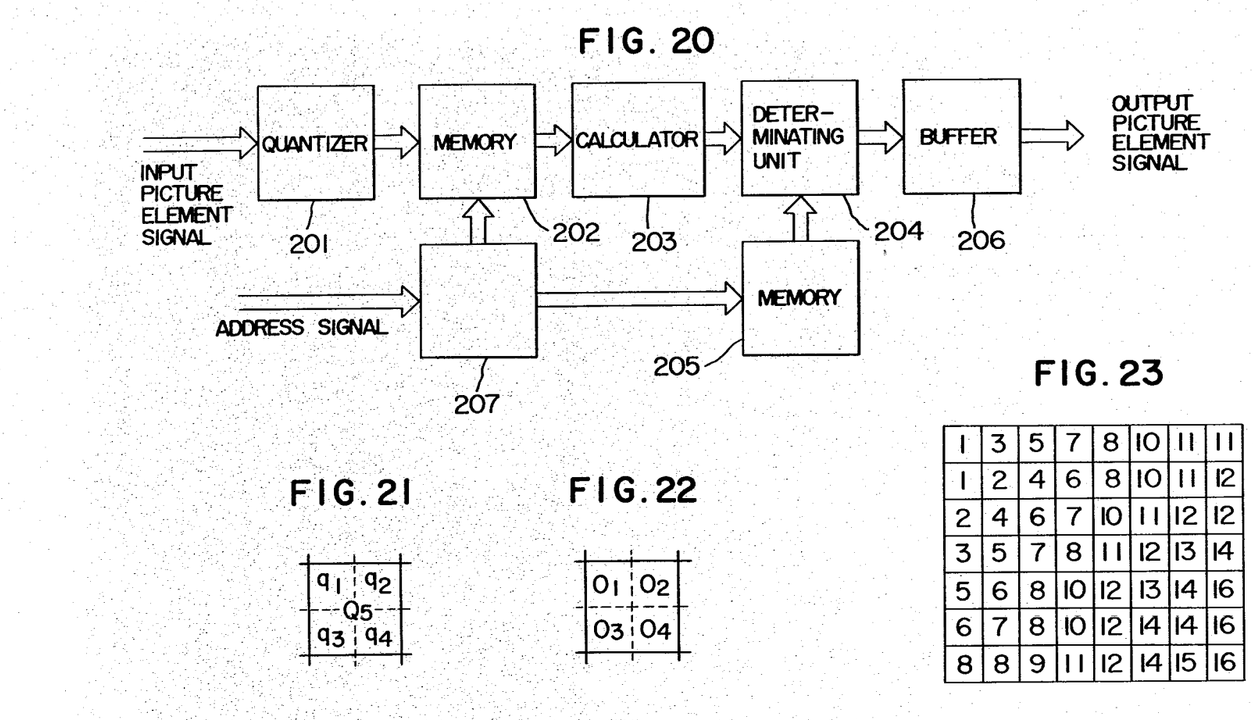
FIG. 20 is a block diagram showing an apparatus for practicing the third example of the method of the invention.
FIG. 21 is a diagram showing the estimation level data of four minute picture elements which are obtained by dividing an aimed picture element into four parts.
FIG. 22 is a diagram showing the outputs of the four minute picture elements in FIG. 21.
FIG. 23 is a diagram showing one example of the density levels of picture elements of a picture including half tone, which is subjected to hexadecimal quantization in accordance with a fourth example of the method of the invention.

FIG. 20 shows one example of a picture processing apparatus for practicing the above-described picture processing method.

Input picture element signals are successively provided by scanning an original picture including half tone and applied to a quantizer 201, where the density data thereof are subjected to multi-base quantization. The resultant quantized signals are successively delivered to a memory 202, so that the density levels in a particular picture element region are collectively stored therein temporarily. Then, according to the contents of the memory 202, a calculator 203 calculates the estimation density levels $q_1$ through $q_9$ of the nine minute picture elements which are provided by dividing the aimed picture element into nine parts, in accordance with the equations (3) mentioned above, and the calculation results are introduced to a determining unit 204. Simultaneously, the threshold levels $T_{k,l}$ corresponding to the minute picture elements are called out of a threshold level memory 205, and are then compared with the estimation density levels qm of the minute picture elements in the determining unit 204, so that the levels of the minute picture elements are determined as black or white as a result of the comparison. The outputs of the determining unit 204 are delivered as binary output picture element signals of high picture element density through an output buffer circuit 206.

In FIG. 20, reference numeral 207 designates an addressing unit adapted to direct addressing for calling picture element data necessary for calculation into the memory 202 in response to address signals which are externally applied thereto, and for calling threshold levels corresponding to minute picture elements to be processed out of the memory 205.

As is apparent from the above description, in the case where an original picture having half tone is reproduced through estimation with binary outputs in accordance with the picture processing method, an aimed picture element is converted into a minute picture element region of $3\times3$ arrangement, the estimation density levels of the minute picture elements are calculated in accordance with the particular equations including the weight factors for the minute picture elements by using the density level of the aimed picture element and those of the surrounding picture elements in the particular picture element region, and the calculation results are compared with the threshold levels corresponding to the minute picture elements in the threshold pattern which has been set in advance, thereby to determine whether the level of each minute picture element is black or white. Thus, the method of the invention also has significant merits that a high tone picture can be reproduced with binary outputs and a picture high in picture element density, excellent in resolution and high in quality can be reproduced at high speed.

A second example of the picture processing method according to the second aspect of the invention will be described with reference to FIGS. 12, 13, and 21 through 27.

Similarly as in the above-described example, an original picture is divided into a number of picture elements, thus forming particular picture element regions, each being of $3\times3$ picture element arrangement (FIG. 12), and the density data of the picture elements $X_1$ through $X_9$ in a particular picture element region are subjected to n-base quantization to provide the density levels $Q_1$ through $Q_9$ of the nine picture elements (FIG. 13).

The estimation density levels $q_1$ through $q_4$ of minute picture elements which are obtained by dividing the aimed picture element $X_5$ into four parts are calculated in accordance with the following equations (4) by using the density level of the aimed picture element $X_5$ and those of the surrounding picture elements $X_1$ through $X_4$ and $X_6$ through $X_9$:

$$q_1=\omega_1\cdot Q_5+\omega_2(Q_1+Q_2+Q_4)$$
$$q_2=\omega_1\cdot Q_5+\omega_2(Q_2+Q_3+Q_6)$$
$$q_3=\omega_1\cdot Q_5+\omega_2(Q_4+Q_7+Q_8)$$
$$q_4=\omega_1\cdot Q_5+\omega_2(Q_6+Q_8+Q_9) \quad (4)$$

where $\omega_1$ and $\omega_2$ are the weight factors for the minute picture elements, with $\omega_1+3\omega_2=1$.

A dither pattern (FIG. 25) is prepared in advance, in which thresholds $T_{l,m}$ corresponding to the four minute picture elements of the aimed picture element $X_5$ are arranged in matrix form. The density levels $q_1$ through $q_4$ of four minute picture elements which have been calculated as described above are compared with the respective thresholds $T_{l,m}$, so that the level of each of the output picture elements $O_1$ through $O_4$ (FIG. 22) is determined as black or white by referring to the following determination conditions:

(i) With $q_1, q_2, q_3, q_4 \geq T_{l,m}$, $O_1, O_2, O_3, O_4 = "1"$ (black level)

(ii) With $q_1, q_2, q_3, q_4 < T_{l,m}$, $O_1, O_2, O_3, O_4 = "0"$ (white level)

The above-described process is carried out for all of the picture elements of the original picture by regarding each as the aimed picture element, as a result of which a picture high in picture element density, excellent in resolution and high in tone can be reproduced.

Figure 24:
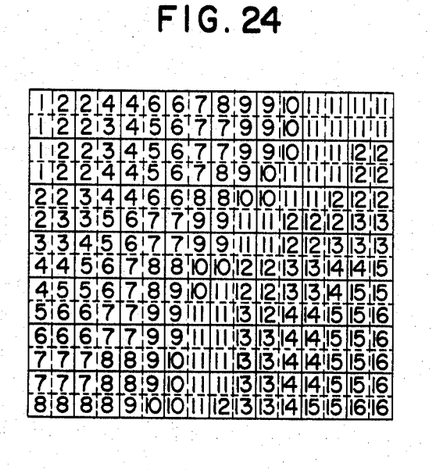
FIG. 24 is a diagram showing the estimation density level of minute picture elements of the picture in FIG. 23, which are provided by dividing each picture element into four minute picture elements.
Figure 25:
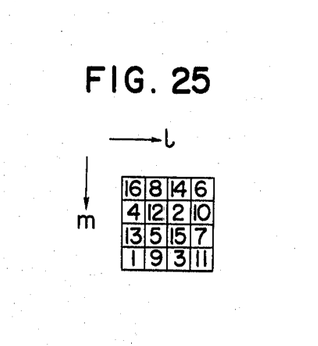
FIG. 25 is a diagram showing one example of a dither pattern employed in the fourth example of the method of the invention.
Figure 26:
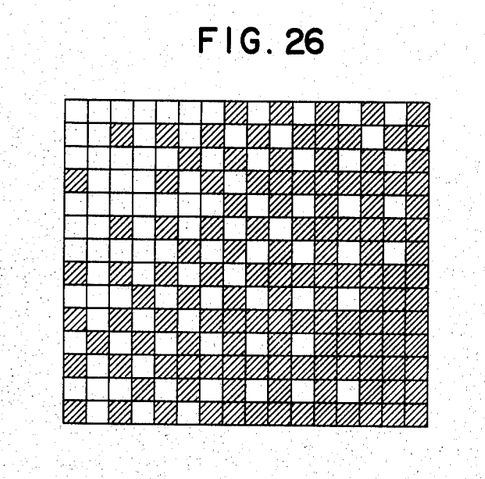
FIG. 26 is a diagram showing a picture which is provided by reproducing the picture in FIG. 5 in accordance with the fourth example of the method of the invention.

The method of the invention will be described concretely. The density levels of the picture elements of an original picture which are provided by subjecting the density data of the picture elements to hexadecimal quantization, which are obtained by scanning the picture are as shown in FIG. 23. In the picture, each picture element is divided into four minute picture elements. The estimation density levels of the minute picture elements, which are calculated according to the equations (5), are as shown in FIG. 24. In this case, the calculations have been carried out with $\omega_1=2/5$ and $3\omega_2=3/5$. FIG. 26 shows a picture which is reproduced by subjecting the minute picture elements of FIG. 24 to dither process with the dither pattern (FIG. 25) as described above. As is clear from FIG. 26, a high tone picture can be reproduced with high resolution by using the binary outputs.

Figure 27:
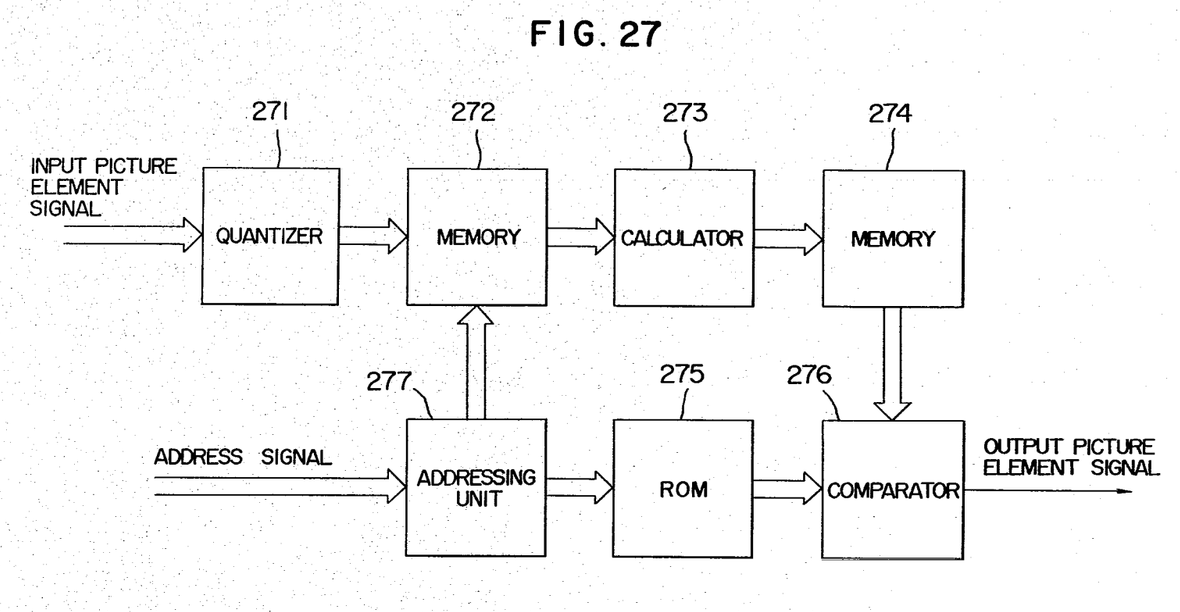
FIG. 27 is a block diagram showing an apparatus for practicing the fourth example of the method of the invention.

FIG. 27 shows one example of a picture processing apparatus for practicing the above-described picture processing method according to the invention.

In the apparatus, input picture element signals are successively provided by scanning an original picture including half tone and applied to a quantizer 271, where the density data thereof are subjected to multi-base quantization. The resultant quantized signals are successively delivered to a memory 272, so that the density levels in a particular picture element region are collectively stored therein temporarily. Then, according to the contents of the memory 272, a calculator 272 calculates the estimation density levels $q_1$ through $q_4$ of the four minute picture elements which are provided by dividing the aimed picture element into four parts, in accordance with the equations (4) mentioned above, and the calculation results are stored in a memory 274. Simultaneously, the thresholds $T_{l,m}$ corresponding to the minute picture elements are called out of a read-only memory 275 in which the dither pattern (FIG. 23) has been stored, and are compared with the estimation density levels $q_1$ through $q_4$ of the minute picture elements in a comparator 276. The level of each minute picture element is determined as black or white as a result of the comparison, and binary output picture element signals of high picture element density are delivered out.

In FIG. 27, reference numeral 277 designates an addressing unit adapted to direct addressing for calling picture element data necessary for calculation into the memory 272 in response to address signals which are externally applied thereto, and for calling thresholds corresponding to minute picture elements to be processed out of the memory 275.

As is clear from the above description, in the case where an original picture having half tone is reproduced through estimation with binary outputs in accordance with the picture processing method, an aimed picture element is divided into a plurality of minute picture elements, the estimation density levels of the minute picture elements are calculated in accordance with the particular equations by using the density level of the aimed picture element and those of the surrounding picture elements in the particular picture elements region, and the calculation results are subjected to dither process by using the dither pattern in which the thresholds have been set for the minute picture elements, so that the level of each minute picture element is determined as black or white. Thus, in the method also, a high tone picture can be reproduced with binary outputs. In addition, as an original picture is subjected to the high picture element density process, a dot picture high in resolution and excellent in quality can be reproduced.

What is claimed is:

1. A picture processing method of restoring a picture including half tone with binary outputs, in which said picture comprises a plurality of picture element units which are sampled in order to provide density levels of said picture elements forming said picture;

said density levels of said picture elements are coded and transmitted to a signal receiving side;

on said signal receiving side, an estimation density level of an aimed picture element is calculated in accordance with a particular equation including a modulation factor and weight factors provided for each of said picture elements in a particular picture element region constituted by said aimed picture element and picture elements surrounding said aimed picture element, by using the density level of said aimed picture element and those of said surrounding picture elements; and said estimation density level is compared with a threshold, corresponding to said aimed picture element, in a threshold pattern preset, so that the level of said aimed picture element is determined as black or white as a result of said comparison.

2. A method as claimed in claim 1, in which out of a plurality of threshold patterns provided in advance, one most suitable for a required modulation factor is selected; and said estimation density level of said aimed picture element is compared with a threshold, corresponding to said aimed picture element, in said threshold pattern thus selected, so that the level of said aimed picture element is determined as black or white as a result of said comparison.

3. A picture processing method of restoring a pictue including half tone with binary outputs, in which said picture comprises a plurality of picture element units which are sampled in order to provide density levels of picture elements forming said picture;

an aimed picture element in said picture elements is divided into a plurality of minute picture elements;

estimation density levels of said minute picture elements are calculated in accordance with particular equations including weight factors provided for said minute picture elements, by using the density level of said aimed picture element and those of picture elements surrounding said aimed picture element in a particular picture element region which is constituted by said aimed picture element and surrounding picture elements; and said estimation density levels of said minute picture elements are compared with thresholds, corresponding to said minute picture elements, in a predetermined threshold pattern, respectively, so that the level of each minute picture element is determined as black or white as a result of said comparison.

4. A method as claimed in claim 3, in which said aimed picture element is divided into nine minute picture elements of $3 \times 3$ arrangement.

* * * * *